March 28, 1944.   J. S. TAYLOR   2,345,510
TIME DELAYED REDUCED VOLTAGE CONTROL CIRCUIT
Filed Nov. 10, 1941   2 Sheets-Sheet 1

INVENTOR
JULIAN S. TAYLOR
BY Walter S. Pfeifer
ATTORNEY

March 28, 1944.    J. S. TAYLOR    2,345,510
TIME DELAYED REDUCED VOLTAGE CONTROL CIRCUIT
Filed Nov. 10, 1941    2 Sheets-Sheet 2

*Fig. 2*

INVENTOR
JULIAN S. TAYLOR
BY *Walter S. Pfeifer*
ATTORNEY

Patented Mar. 28, 1944

2,345,510

UNITED STATES PATENT OFFICE 2,345,510

TIME DELAYED REDUCED VOLTAGE CONTROL CIRCUIT

Julian S. Taylor, Shorewood, Wis., assignor to Allen-Bradley Company, Milwaukee, Wis., a corporation of Wisconsin Application November 10, 1941, Serial No. 418,499

9 Claims. (Cl. 175—375)

This invention relates to an improved time delayed reduced voltage control circuit.

The control circuit herein described is an improvement of the circuit described in the pending application of Allen K. Wolfe for "Time delayed reduced voltage control circuit," Serial No. 377,186, filed February 3, 1941, and includes as a part thereof the control scheme described in the pending application of Lynn H. Matthias for "Electric control circuit," Serial No. 382,510, filed March 10, 1941. Both pending applications are assigned to the Allen-Bradley Co., the assignee of this application.

The object of this invention is to secure an improved time delayed reduced voltage control circuit that can be operated by three-wire control in the usual manner from one or more "start" and "stop" control stations and readily adapted for operation by two-wire control.

A further object is to obtain an improved time delayed reduced voltage control circuit in which movement to the circuit making position is controlled by closing a circuit and control to the open circuit position is obtained by interrupting a circuit.

A further object is to obtain a time delayed reduced voltage control circuit operable from one or more "start" and "stop" control stations in which, after restoration of normal voltage following a period of reduced voltage sufficient to actuate the timing relay, all control elements return automatically to their proper open circuit position.

In certain circuit control circuits it is advantageous to have the circuit remain in the operative position in the event of a voltage dip or interruption of power for a short period of time. One application for a circuit of this type is the control of electric motors driving loads having high inertia.

Electric motors operating under conditions of high inertia can have the power supply reduced or interrupted for short periods of time without being disconnected from the power supply as is the usual practice in circuits having reduced or no voltage protection. In control applications of this type, it is advantageous to have a control circuit that remains in the operative position for the short period of reduced voltage during which the motor can safely remain connected to the source of power without operation of the starting control station.

The reduced voltage or voltage dip control circuit herein disclosed utilizes a "start" and "stop" control circuit that functions upon operation of the "start" switch as an energizing circuit for a two-position relay and as a shunt circuit around the "off" means of the two-positioned relay preventing operation thereof from "on" to "off" position. The two-position relay controls the energization of the timing relay and the two relays each have circuit connecting means jointly controlling the connection of the load to the source of power.

For two-wire control the "start" and "stop" control circuit is replaced with a single pole control switch, which switch, when closed, establishes an energizing circuit for the two-position relay and a shunt circuit around the "off" means of the two-position relay preventing operation thereof from "on" to "off" position.

For three-wire control the "start" and "stop" control circuit functions as an energizing circuit for the two-position relay and as a shunt circuit to prevent operation of the two-position relay from "on" to "off" position for a period of time sufficient to permit the establishment of a maintained shunt circuit by the timing relay in the "on" position and the normally closed "stop" switches of the control stations.

The operation of the control circuit differs from that disclosed by the aforesaid Allen K. Wolfe in that control over the movement of the two relays to "off" position is effected by the interruption of a circuit and not by making a circuit connection. Further, the control circuit includes novel circuit connections whereby all circuit elements return automatically to the "off" position upon restoration of normal voltage following a period of reduced voltage sufficient to operate the timing relay. The control circuit, illustrative of the arrangement whereby the objects of this invention are obtained, is shown on the attached drawings forming a part of this specification.

Figure 2 is a line diagram showing the circuit connections of the control system in Figure 1.

Figure 1:
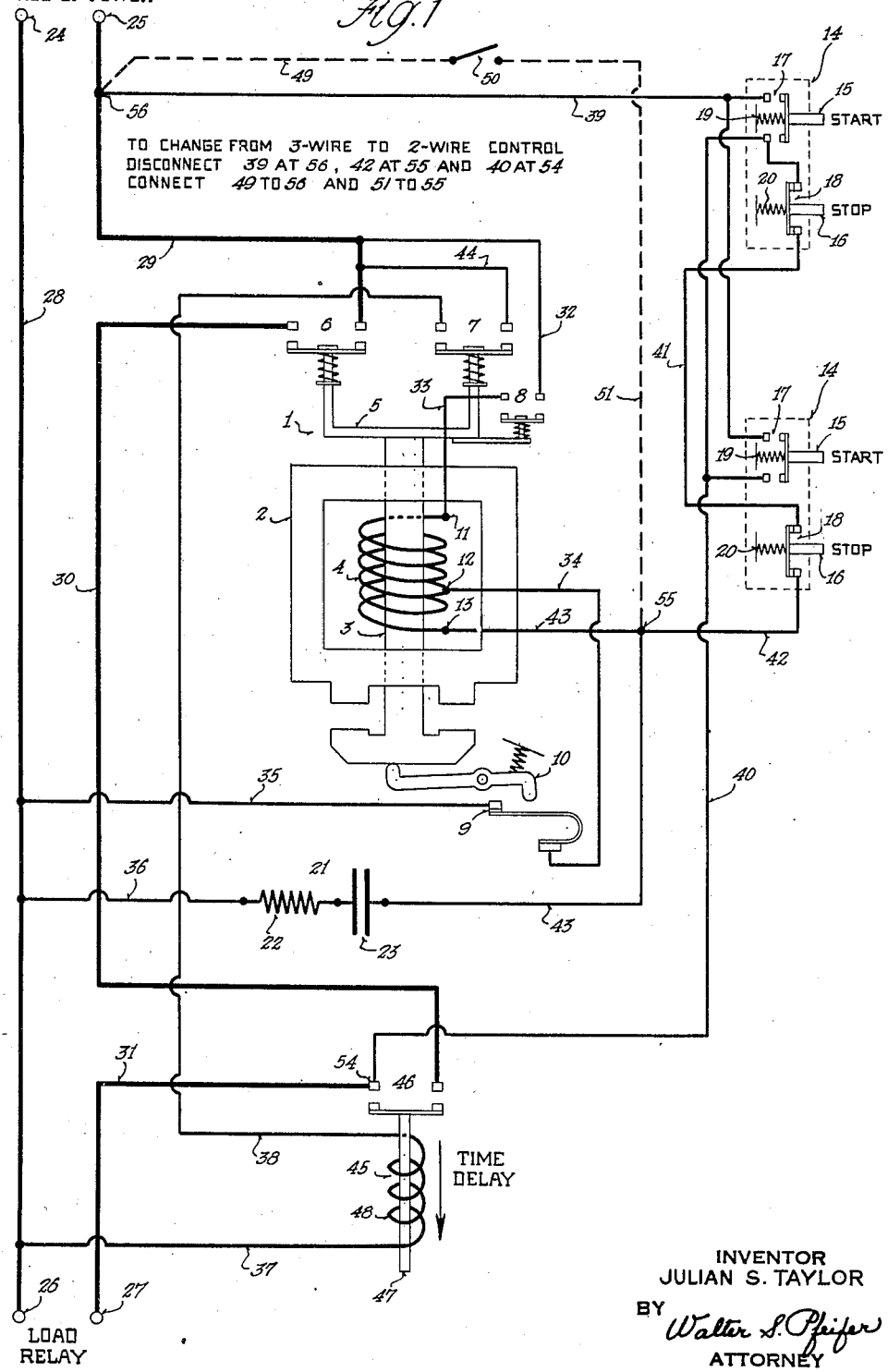
Figure 1 is the control circuit showing the operation of the preferred form of this invention.

The preferred form of the invention shown in Figure 1 is a control circuit operable from one or more "start" and "stop" control stations 14 to control the connection of an electric load to a source of alternating current electric power. The control circuit includes a two-position relay 1, a time delay relay 45, an impedance 21 and two control stations 14. There is also shown an alternative control circuit whereby the circuit can readily be changed from three-wire to two-wire control. The two-wire control circuit is shown in Figures 1 and 2 in broken line. The changes necessary to convert the control circuit from three-wire to two-wire control are designated in Figure 1.

The two-position relay 1 shown in the preferred form, is a relay of the type disclosed in the pending application of Gustav O. Wilms and Albert J. Dawe for "Electromagnetically operated devices," Serial No. 315,040, filed January 22, 1940. This relay includes a fieldpiece 2 and cooperating armature 3 that is moved to closed position by means of a portion of switch coil 4 and returned to open position by gravity. The movement of the armature 3 to either open or closed positions operates switches 6, 7, 8 and 9. Switches 6, 7 and 8 are operated by the switch actuator assembly 5 attached to the top of the armature 3. Switch 9 is operated by the spring biased lever mechanism 10 coupled to the bottom of armature 3.

In the normal or open position shown in Figure 1, switches 6, 7 and 8 are open and are designated "normally open;" switch 9 is closed and is designated "normally closed." When the armature 3 moves to the closed position, switches 6 and 7 close before switch 8 closes and switch 9 opens. This is obtained by properly spacing the contacts as shown in Figure 1.

The two-position relay 1 is held in the open position by the weight of the armature 3 and attached parts. Movement of the armature 3 to closed position is obtained by energizing the portion of switch coil 4 between terminals 12 and 13. As the armature 3 engages fieldpiece 2, the energized portion of the coil 4 is de-energized by the opening of switch 9 and the armature 3 remains in engagement with fieldpiece 2 by virtue of the residual magnetism remaining in the magnetic circuit.

The two-position relay 1 is moved from the closed position to the open position by energizing the entire switch coil 4 with a demagnetizing force just sufficient to reduce the residual magnetism in the magnetic circuit to a value that will allow armature 3 to drop to the open position.

For three-wire control one or more control stations 14 can be used to control the operation of the two relays employed in this control circuit. Each control station 14 is identically the same and each includes a "start" means 15 and a "stop" means 16. The "start" means 15 consists of a normally open switch 17 held in the open position by means of spring 19. Upon compression of spring 19, switch 17 is moved to the closed position. The "stop" means 16 includes a normally closed switch 18 held in the closed position by spring 20. Upon compression of spring 20, normally closed switch 18 moves to the open position.

The source of alternating current electric power at terminals 24 and 25 is connected to a load relay at terminals 26 and 27 by means of the circuit shown in heavy black lines in Figures 1 and 2. This circuit includes conductors 28, 29, 30 and 31 and switches 6 and 46 in their closed positions. Upon operation of either "start" means 15, a circuit is completed from conductor 28 through conductor 35, normally closed switch 9, conductor 34 to terminal 12 of switch coil 4, a portion of coil 4 to terminal 13, the portion of conductor 43 to terminal 55, conductor 42, a normally closed switch 18, conductor 41, a second normally closed switch 18, a portion of conductor 40, a normally open switch 17 in its closed position, and through conductor 39 to conductor 29. This circuit connection energizes the part of coil 4 between terminals 12 and 13 to move the two-position relay 1 to the closed position and simultaneously therewith opening switch 9 to de-energize coil 4 allowing armature 3 to remain in engagement with fieldpiece 2 by virtue of the residual magnetism remaining in the magnetic circuit.

Simultaneously with the movement of the two-position relay 1 to the closed position a circuit is completed from conductor 28 through conductor 36, the impedance 21 that includes resistance 22 and condenser 23, conductor 43, the entire coil 4 from terminals 13 to 11, conductor 33, switch 8 in its closed position, and conductor 32 to conductor 29. This circuit is effective to energize coil 4 to move the two-position relay from "on" to "off" position upon interruption of a shunt circuit that is established around coil 4 before closure of switch 8.

The shunt circuit that is established around coil 4 to prevent effective energization of the two-position relay 1 to the "off" position thereof is maintained by the "start" switch 15 that is actuated to effect operation of the two-position relay 1 to the "on" position. This shunt circuit includes a conductor 42, a normally closed switch 18, conductor 41, a second normally closed switch 18, a portion of conductor 40, a normally open switch 17 in its closed position and conductor 39. Upon operation of the two-position relay 1 and upon operation of the timing relay 45, as described below, switch contacts 6 and 46 close and establish a shunt circuit around coil 4 that is independent of "start" buttons 15—15. The maintained shunt circuit that is effective to prevent energization of coil 4 includes conductor 42, a normally closed switch 18, conductor 41, a second normally closed switch 18, the portion of conductor 40 to terminal 54, switch 46 in its closed position, conductor 30, and switch 6 in its closed position.

By this circuit arrangement movement of the two-position relay to the open circuit position under conditions of normal voltage is controlled by operation of a "stop" button 16. A further advantage obtained from this shunt connection is the return of the two-position relay 1 to its "off" position upon restoration of normal voltage following a period of reduced voltage sufficient to operate the timing relay 45 and open switch 46.

The control circuit employs a shunt circuit jointly maintained by "stop" switches 16—16 of the control circuit and the switch 46 associated with the timing relay 45. Under conditions of normal voltage of the source of power, the load can be promptly disconnected from the source by operation of either of the "stop" means 16 interrupting the shunt circuit connection around coil 4 of the two-position relay 1. This permits effective energization of coil 4 to dissipate the residual magnetism present in the magnetic circuit of the two-position relay 1 permitting the relay to move to the open position. Movement of the two-position relay 1 to the open position disconnects the load from the source of power and de-energizes coil 48 of the timing relay 45.

Simultaneous with the movement of the two-position relay 1 to the closed position, a circuit is completed by closure of switch 7 energizing the coil 48 of the timing relay 45. The energizing circuit for the timing relay 45 includes conductor 28, conductor 37, coil 48, conductor 38, normally open switch 7 in its closed position, conductor 44 and conductor 29. Movement of the two-position relay 1 and the time delay relay 45 to their respective closed positions closes switches 6 and 46 respectively, completing the connection of the load relay to the source of electric power and establishing the maintained shunt circuit described above.

The timing relay 45 employed in this circuit is of the type that is electromagnetically actuated to the closed circuit position and upon a predetermined reduction in energization having a time delay means responsive to delay its return to the open circuit position. The time delay relay 45 is moved to closed circuit position by energizing coil 48 to move actuator 47 to a position to close switch 46. This switch remains closed as long as coil 48 remains properly energized. Upon predetermined reduction of energization of coil 48, the return of actuator 47 to its normal position is delayed for a definite period of time as long as such change in energization of coil 48 persists. Upon expiration of the time period, switch 46 returns to the open circuit position.

Coil 48 of the time delay relay 45 is so designed that upon a reduction of the voltage of the source of electric power, below a minimum value, the relay is operative to return to its normal position upon the expiration of a definite period of time during which the condition of reduced voltage persists. The purpose of this control circuit is to provide a circuit arrangement for connecting a load to a source of power and responsive upon occurrence of predetermined reduced voltage conditions to maintain the connection for a definite period of time. During the occurrence of a condition of low voltage, the two-position relay 1 in the closed position maintains circuit connections jointly with the time delay relay 45 whereby the connection of the load to the source of power persists for a period of time.

Upon occurrence of a condition of reduced voltage and after the expiration of the time delayed period of relay 45, actuator 47 returns to the open position returning switch 46 to its open position disconnecting the load from the source of power and interrupting the shunt circuit around coil 4. The two-position relay 1 remains in its closed position if the voltage of the source is insufficient to effectively energize coil 4. Upon return of the voltage of the source of power to normal condition, the two-position relay 1 automatically returns to its proper "off" position. The automatic return of the two-position relay 1 to its proper "off" position upon restoration of normal voltage, is a distinct advantage over the scheme disclosed in the above mentioned pending application of Allen K. Wolfe in which return of the two-position relay 1 to its "off" position is made manually by operation of one of the "stop" means.

In the event of a condition of reduced voltage occurring for a period of time less than the time setting of relay 45, the circuit remains in the closed position. The time delay means of relay 45 is initiated upon occurrence of predetermined low voltage. Upon restoration of normal voltage before expiration of the time period, the time delay means is restored to its initial position thus requiring for each low voltage condition, sufficient to disconnect the load from the source, substantial continuity of the reduced voltage condition for a period of time equal to or greater than the setting of the time delay relay 45.

The operation of the control circuit shown in Figure 1 is more clearly shown in the line diagram given in Figure 2. In this diagram the essential circuit connections are shown in more simple form than that given in the wiring diagram of Figure 1. Reference to this diagram will assist in tracing the connections of the control circuit.

A further advantage of the control circuit of this invention resides in its equal adaptability to either two-wire or three-wire control. In the preferred form shown, the control of the circuit is obtained by the usual three-wire control scheme employing conventional "start" and "stop" control station. It is possible to substitute for the control stations a simple two-wire control whereby all of the above mentioned control advantages can be obtained with the exception of the automatic return of the two-position relay 1 to its "off" position upon restoration of normal voltage following a low voltage condition sufficient to operate the timing relay.

The ready adaptability of the control circuit for either three-wire or two-wire control is shown in Figure 1 and Figure 2. Figure 1 shows the exact changes in wiring necessary to complete the conversion from three-wire to two-wire control. The three-wire control scheme is shown in both figures in solid line. In order to change from three-wire to two-wire control, it is only necessary to disconnect conductor 39 at terminal 56, conductor 42 at terminal 55, and conductor 40 at terminal 54, and then to connect between terminals 55 and 56 the two-wire control circuit comprising switch 50 and conductors 49 and 51 as shown in broken line.

For two-wire control the closure of switch 50 completes an energizing circuit from conductor 29 through conductor 49, switch 50 in its closed position, conductor 51, a portion of conductor 43, that portion of coil 4 between terminals 13 and 12, conductor 34, normally closed switch 9, and conductor 35 to conductor 28. The closure of switch 50 also provides a shunt circuit that is effective to prevent the energization of coil 4 upon closure of switch 8. Upon opening of switch 50, the switch coil 4 is effectively energized in the manner set forth above to return the two-position relay to "off" position.

I claim as my invention:

1. A control circuit operable by a source of alternating current electric power for connecting an electric load to said source of electric power to maintain such connection for a definite period of time upon the occurrence of a reduction of voltage of the source below a minimum value, comprising a time delayed voltage relay responsive when connected to the source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means operative to actuate the two-position relay and the timing relay to their "on" positions to jointly connect the load to the source; said control means, in operated position to actuate said two relays to their "on" positions, establishing a shunt circuit around said second electro-responsive means to prevent operation thereof; and movement of said two-position relay establishing connections effective to energize said second electro-responsive means whereby, upon interruption of said shunt circuit said second electro-responsive means is energized to return the two-position relay to "off" position.

2. A control circuit operable by a source of alternating current electric power for connecting an electric load to said source of electric power to maintain such connection for a definite period of time upon the occurrence of a reduction of voltage of the source below a minimum value, comprising a time delayed voltage relay responsive when connected to the source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means operative to actuate the two-position relay and the timing relay to their "on" positions to jointly connect the load to the source and simultaneously therewith said control means and the timing relay jointly establishing a shunt circuit around said second electro-responsive means to prevent operation thereof; and movement of said two-position relay to "on" position establishing connections effective to energize said second electro-responsive means upon interruption of said shunt circuit by said control means or by movement of said time delayed voltage relay to "off" position.

3. A control circuit operable by a source of alternating current electric power for connecting an electric load to said source of electric power to maintain such connection for a definite period of time upon the occurrence of a reduction of voltage of the source below a minimum value, comprising a time delayed voltage relay responsive when connected to the source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; control means for said two relays comprising "start" means and "stop" means with said "start" means controlling the movement of said two relays to their "on" positions to jointly connect the load to the source; said "start" means in operated position establishing a shunt connection around said second electro-responsive means to prevent operation thereof; operation of said "start" means establishing connections effective to energize said second electro-responsive means; and said "stop" means in normal position and said time delayed voltage relay in "on" position maintaining said shunt connection independent of said "start" means, whereby the movement of said two-position relay to "off" position is controlled by said "stop" means or upon occurrence of a low voltage time condition sufficient to move said time delayed voltage relay to "off" position said shunt circuit is interrupted by the timing relay thus permitting effective energization of the "off" means of said two-position relay when the voltage of said source is restored.

4. A control circuit operable by a source of alternating current electric power for connecting an electric load to said source of electric power to maintain such connection for a definite period of time upon the occurrence of a reduction of voltage of the source below a minimum value, comprising a time delayed voltage relay responsive when connected to the source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; control means for said two relays comprising "Start" means and "stop" means with said "start" means controlling the movement of said two relays to "on" position to jointly connect the load to the source; said two-position relay in the "on" position establishing circuit connections effective to energize said second electro-responsive means upon interruption of a shunt connection around said second electro-responsive means; and said shunt connection maintained jointly by said "stop" means in normal position and said time delayed voltage relay in "on" position whereby, under conditions of normal voltage of said source, operation of the "stop" means is effective to restore the two-position relay to "off" position and movement of the time delayed voltage relay to "off" position is effective to restore the two-position relay to "off" position when the voltage of the source is sufficient to actuate the electro-responsive "off" means of the two-position relay.

5. In a control circuit operable by a source of alternating current electric supply comprising a time delayed voltage relay responsive when connected to said source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means operative to actuate the two-position relay and the timing relay to their "on" positions to jointly connect a load to the source and maintain such connection for a definite period of time upon the occurrence of a reduction of voltage of the source below a minimum value; the combination with said control circuit of switch means associated with said control means and a second switch means associated with said timing relay operative, upon actuation of said control means to move said two relays to their "on" positions, to jointly establish a shunt circuit effective to prevent operation of said second electro-responsive means, the actuation of said two relays to their "on" positions establishing connections effective to energize said second electro-responsive means upon interruption of said shunt circuit by said control means or by movement of said time delayed voltage relay to "off" position.

6. In a control circuit operable by a source of alternating current electric power comprising a time delayed voltage relay responsive when connected to said source of power to move to "on" position and upon occurrence of a predetermined low voltage time condition of the source returning from said "on" position to "off" position; a two-position relay having electro-responsive means to move said two-position relay to "on" position, a second electro-responsive means to move said two-position relay to "off" position and means independent of continuous energization of either of said electro-responsive means to hold said two-position relay in either "on" or "off" position; and control means operative to actuate the two-position relay and the timing relay to their "on" positions to jointly connect a load to the source and maintain such connection for a definite period of time upon the occurrence of a reduction of voltage of the source below a minimum value; the combination with said control circuit of switch means associated with said control means connected in series with a second switch means associated with said timing relay operative to jointly establish a shunt circuit effective to prevent operation of said second electro-responsive means upon actuation of said control means to move said two relays to their "on" positions; the actuation of said two relays to their "on" positions establishing connections effective to energize said second electro-responsive means upon interruption of said shunt circuit by said control means or by movement of said time delayed voltage relay to "off" position.

7. In a control circuit operable by a source of alternating current electric power comprising a time delayed voltage relay responsive when connected to said source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means operative to actuate the two-position relay and the timing relay to their "on" positions to jointly connect a load to the source and maintain such connection for a definite period of time upon the occurrence of a reduction of voltage of the source below a minimum value; the combination with said control circuit of means associated with said control means establishing a shunt circuit around said second electro-responsive means to prevent operation thereof simultaneously with the operation of said control means to actuate the two-position relay to "on" position; normally closed switch means associated with said control means connected in series with a switch means associated with said timing relay jointly maintaining said shunt circuit after movement of the timing relay to "on" position, whereby, the shunt circuit is maintained independent of sustained actuation of said control means; the movement of said two-position relay to "on" position establishing connections effective to energize said second electro-responsive means upon interruption of said shunt circuit by said control means or by movement of said time delayed voltage relay to "off" position.

8. In a control circuit operable by a source of alternating current electric power comprising a time delayed voltage relay responsive when connected to said source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means operative to actuate the two-position relay and the timing relay to their "on" positions to jointly connect a load to the source and maintain such connection for a definite period of time upon the occurrence of a reduction of voltage of the source below a minimum value; the combination with said control circuit of switch means associated with said control means and a second switch means associated with said timing relay jointly establishing a shunt circuit around said second electro-responsive means to prevent operation thereof simultaneously with the operation of said control means to actuate said two relays to their "on" positions; the movement of said two-position relay to "on" position establishing connections effective to energize said second electro-responsive means upon interruption of said shunt circuit by said control means or by movement of said time delayed voltage relay to "off" position.

9. A voltage dip control circuit for a source of alternating current electric power operable by one or more "start" and "stop" control stations or by a two-wire control circuit, comprising a time delayed voltage relay responsive when connected to the source of power to move to "on" position and upon occurrence of a predetermined low voltage time condition of the source returning from said "on" position to "off" position; a two-position relay having electro-responsive means to move said two-position relay to "on" position; a second electro-responsive means to move said two-position relay to "off" position; means independent of continuous energization of either of said electro-responsive means to hold said two-position relay in either "on" or "off" position; and control means to actuate said two relays to their "on" positions to jointly connect a load to the source and operative to actuate said two relays to their "off" positions to disconnect the load from the source; said control means in "on" position establishing a shunt circuit around said second electro-responsive means to prevent operation thereof; the movement of said two-position relay to "on" position establishing connections effective to energize said second electro-responsive means upon interruption of said shunt circuit; said shunt circuit being established by a switch means operative to "on" or "off" position to render said circuit controllable by "two-wire" control; and for operation by one or more "start" and "stop" control stations said shunt circuit being established jointly by said "stop" control stations in their normal positions and a "start" station in operated position, and said shunt circuit after actuation of said two relays to "on" position being maintained independent of the "start" stations by switch means associated with said timing relay in "on" position.

JULIAN S. TAYLOR.